United States Patent [19]
Kaneko et al.

[11] 3,755,736
[45] Aug. 28, 1973

[54] PHASE TRACKING SYSTEM FOR AN AUTOMATIC EQUALIZATION

[75] Inventors: Haruo Kaneko; Seiichiro Shigaki, both of Tokyo, Japan

[73] Assignee: Nippon Electric Company, Limited, Tokyo, Japan

[22] Filed: Sept. 1, 1971

[21] Appl. No.: 177,073

[30] Foreign Application Priority Data

Sept. 3, 1970 Japan .............................. 45/77663

[52] U.S. Cl. .................... 325/42, 325/324, 325/325, 325/326, 325/476, 333/18

[51] Int. Cl. ............................................ H04b 1/00

[58] Field of Search ...................... 325/42, 322–324, 325/326, 476, 41, 58; 333/17, 18

[56] References Cited

UNITED STATES PATENTS

| | | | |
|---|---|---|---|
| 3,633,108 | 1/1972 | Kneuer | 325/326 |
| 3,509,279 | 4/1970 | Martin et al. | 325/326 |

*Primary Examiner*—Albert J. Mayer
*Attorney*—Richard C. Sughrue, Thomas J. Macpeak et al.

[57] ABSTRACT

Disclosed herein is a phase tracking system adapted for use with an automatic equalization circuit. This system causes a reference timing pulse, derived from a timing component of a received reference signal, to track the peak of the equalized reference signal, the phase of the extracted timing component randomly varying with respect to the reference signal. Tracking is accomplished by generating a variable level signal and first and second timing pulses occurring respectively, at a selected time before and after the derived reference timing pulse. When the first and second timing pulses are generated, the level of the equalized reference signal is compared with the level of the variable level signal. If the level of the equalized reference signal is greater than that of the variable level signal at one of the comparison times and less than the level of the variable level signal at the other of the comparison times, the phases of the first, second and reference timing pulses are varied in a direction to tend to cause coincidence between the peak of the equalized reference signal and the reference timing pulse. Further, if the equalized reference signal is greater than or less than the level of the variable level signal at both comparison times, the level of the variable level signal at the other comparison time. In this manner, the system causes the reference timing pulse to attempt to align itself with the peak of the equalized reference signal.

3 Claims, 8 Drawing Figures

FIG I

PHASE TRACKING SYSTEM FOR AN AUTOMATIC EQUALIZATION

This invention relates to a phase tracking system for an automatic equalization, wherein the phase of a timing signal is caused to track the phase of a time-sequential reference pulse.

In the long distance transmission of TV video signals through a frequency-division multiplexed communication channel, the time varying transmission characteristics of the communication channel, such as amplitude or phase versus frequency characteristics of the channel, must be exactly equalized continuously. For this purpose, Arnon proposed an automatic equalizing system, wherein a test pulse is transmitted for monitoring the channel condition, and thus the exact channel equalization is performed. (See E. Arnon's paper "An Adaptive Equalizer for TV channels," IEEE–ICC '69, 69CP304-COM, 1–15 ≈ 1–20).

In the Arnon's equalizing system, an impulse signal is repeatedly transmitted through the transmission channel as a reference pulse, which is then received at a receiving station and compared with the waveform of the reference locally produced at the receiving station. The equalization is then performed at the echo-suppressor type equalizer disposed at the receiving station, so that the received waveform may be equalized with that of the reference waveform. The reference waveform in a narrow-width pulse expressed, for example, by $(\sin 2\pi f_c t)/2\pi f_c t$ (where $f_c$ is the highest frequency of the pass band of the transmission channel), and includes the frequency components in the whole of the transmission band but no components outside of the frequency band. The echo suppression type equalizer comprises: a delay means with a plurality of tappings spaced by a uniform distance corresponding to $1/(2f_c)$ second; variable attenuators connected to said tappings; and means for combining the output signals from said attenuators. It is essential for achieving the desired equalization with the Arnon's system that the two zero crossing points of the received reference pulse lies exactly $1/(2f_c)$ second ahead and behind the peak of the waveform, respectively. To achieve this, an exact prediction is needed for the time points at which the zero-crossing points fall. Such prediction may be performed by employing an $f_c$-component extracting means at the receiving station. It is nevertheless difficult to predict the exact time of arrival of the reference signal. This is due to the fact that the time positions of the peak and the zero-crossing points of the received reference signal, deviate at random because of linear distortions of the transmission channels, even if they are exactly set at the transmitting side. Also, as long as an exact equalization is performed, reference pulse waveform at the output of the equalizer must be exactly the same as that of the reference pulse observed at the transmission side. However, the abrupt change in the waveform at the initiation of the equalizing operation and other change attributable to circuit components make it difficult to keep the phase relationship between the extracted timing signal and the equalized reference pulse waveform and thereby to exactly predict the time point of the reception of the reference pulse.

On the other hand, the increased demand for a greater number of TV signals and automatic channel switching requires an equalization system of faster response and higher accuracy.

The object of the present invention is therefore to provide phase tracking system capable of quick and accurate tracking.

The present invention is applicable to those equalizing systems where the reference pulse $e(t)$ is transmitted periodically. At the initiation of the equalizing operation, the accuracy of the prediction for the time point of the reception of the reference pulse is such that no prediction error is caused at the reference pulse sensing means. Once the initial tracking is completed to reach the steady state, there is virtually no difference between the predicted time point and the actual time point of the reception of the reference pulse.

Detailed explanation on the invention will now be given hereunder referring to the attached drawings wherein.

Figure 1:
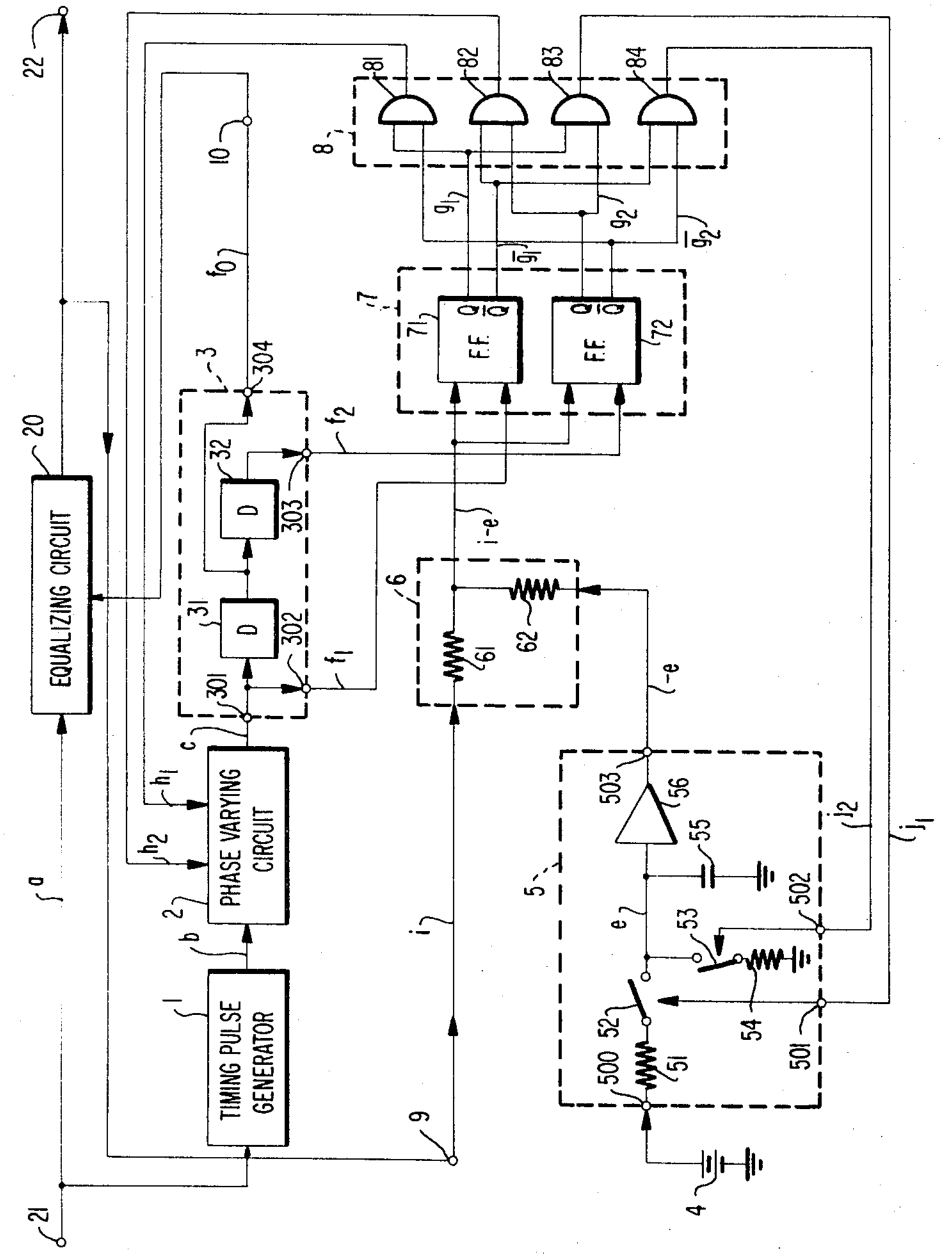
FIG. 1 is a block diagram showing an embodiment of the invention.

FIGS. 5*a* through 5*d* are waveforms for explaining the operation of FIG. 1.

Referring to FIG. 1, reference numeral 1 denotes a timing pulse generating circuit; 2, a phase varying circuit; 3, a reference timing pulse group generating circuit; 4, a direct current power source; 5, a voltage control circuit; 6, a combining circuit; 7, a discriminating circuit; 8, a logic network; 9, an input terminal; 10, an output terminal of phase tracked timing pulses; 20, an equalizing circuit; 21, an input terminal for the TV signal transmitted through a transmission channel; and 22, an output terminal for the equalized signal. As to the equalization circuit 20, the automatic equalization circuit as proposed by the above-mentioned Arnon may be used.

Figure 2:
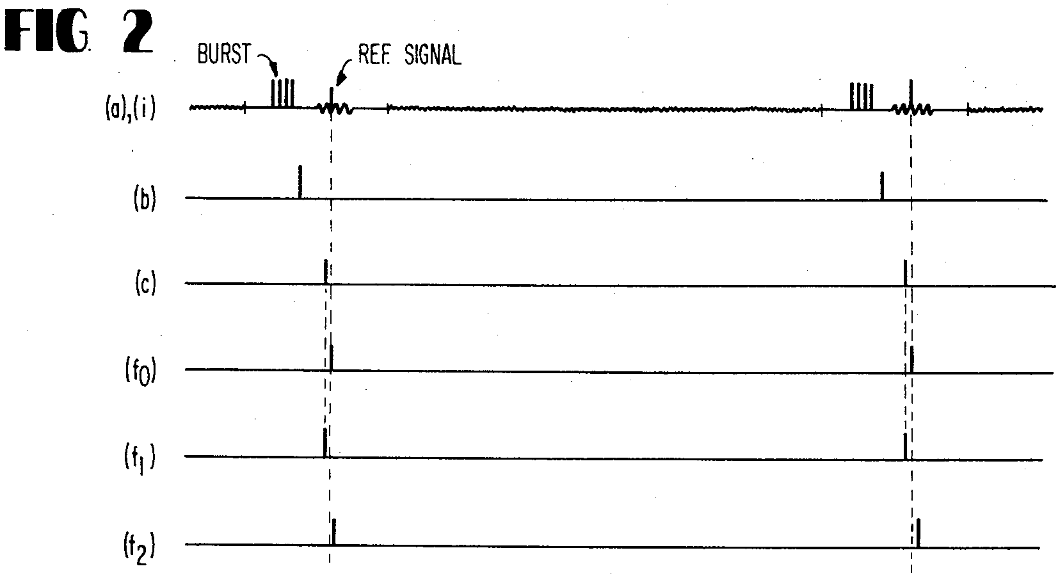
FIG. 2 is a time-chart showing the operation of FIG. 1.

FIG. 2 shows waveforms observed at the respective circuit points in the block diagram of FIG. 1. As shown, the input signal *a* from the terminal 21 includes reference pulses at a constant interval. In this embodiment, each of the reference pulses is composed of a plurality of pulses having a specific pattern. The timing generating circuit 1 having a narrow band filter extracts the periodical timing component *b* of the reference signal from the input signal *a*. For facilitating this timing signal component, burst signals are inserted ahead of each of the reference pulses. The time positions of the reference pulses are not constant with respect to the timing pulse *b*. They are subject to deviation caused by the linear distortions of transmission channels.

In the phase tracking system of this invention, the extracted timing pulse *b* is caused to exactly track the exact time point of the peak of the reference pulses.

Figure 3:
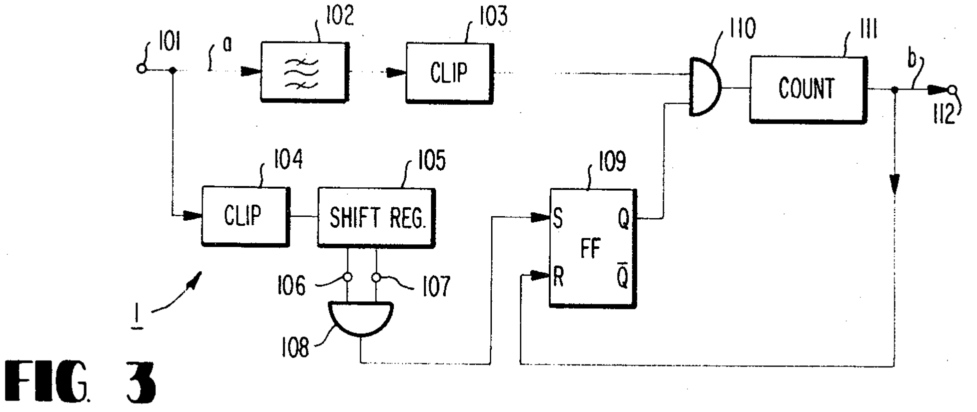
FIG. 3 is a block diagram of a timing pulse generating circuit in FIG. 1.

The timing pulse generating circuit 1 is illustrated in more detail in FIG. 3. The input signal *a* is applied through a terminal 101 to a band-pass filter 102, which extracts only the burst component and generates a continuous sinsoidal signal having a substantially constant level. An amplitude clipping circuit 103 shapes the output of the circuit 102 and applies its output to an AND gate 110. Another clipping circuit 104 generates a group of pulses at a given time interval during the whole of the burst signal duration and the reference signal duration. A shift register 105 receives the group of pulses and generates output pulses at its first and second stage output terminals 106 and 107. The output pulses from the terminals 106 and 107 are applied to an AND gate 108, which sends out the output only when there are at least two pulses in a row at the output of the clipping circuit 104. This assures the discrimination of the pulses corresponding to the burst signal peaks from the pulses corresponding to the reference pulse peaks. The output of the gate 108 is applied to the set-terminal of a flip-flop 109 whose true-value output is applied to the gate 110 to permit the output pulse train of the clipping circuit 103 to be transmitted to a counter 111. The counter 111 generates the output pulse $b$ at a rate of one to every five incoming pulses counted. The output pulse $b$ is extracted at output terminal 112 as the output of the circuit 1. Also, the output $b$ is applied to the reset terminal of the flip-flop 109. Once pulse $b$ is sent back to the flip-flop 109 to reset it, the gate 110 is kept closed until the next burst signal arrives at the input terminal 101.

Referring again to FIG. 1, the voltage control circuit 5 includes a voltage holding capacitor 55 and a buffer amplifier 56 with polarity inversion function. When a voltage-increase-instruction signal $j_1$ is applied to a terminal 501 from the logic network 8 (to be described later), a switch 52 is closed and a current from the direct current power source 4 is supplied to the capacitor 55 through an input terminal 500 and a resistor 51, increasing the terminal voltage thereof. On the contrary, when a voltage-decrease-instruction signal $j_2$ is applied to a terminal 502 from the logic network 8, a switch 53 is closed and the electric charge in the holding capacitor 55 is discharged to the ground through the switch 53 and a resistor 54, decreasing the terminal voltage of the capacitor.

The terminal voltage of the holding capacitor 55 is amplified to an appropriate level by the buffer amplifier 56 and applied to a resistor 62 of the combiner circuit 6 through a terminal 503. The output voltage at the terminal 503 is kept unchanged so long as the next instruction signal $j_1$ or $j_2$ is applied at terminal 501 or 502.

The combining circuit 6 combines the output voltage $-e$ and the signal $i$ and supplies the combined signal $i-e$ to the camparator group 7.

Figure 4:
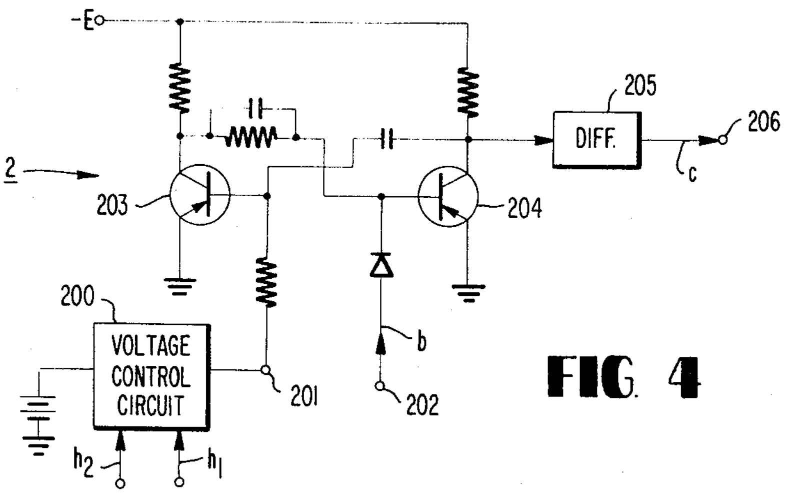
FIG. 4 is a block diagram of a phase varying circuit in FIG. 1.

The phase varying circuit 2 is detailed in FIG. 4. A voltage control circuit 200 similar to the above-mentioned circuit 5 generates the control voltage at the output terminal 201 in response to a delay-increase-instruction signal $h_2$ and a delay-decrease-instruction signal $h_1$ supplied from the logic network 8. Transistors 203 and 204 constitute a voltage controlled monostable multivibrator triggered by the pulses $b$ supplied through a terminal 202. The pulse width of the output of the multivibrator is controlled by the control voltage at the terminal 201. The output of the multivibrator is differentiated by a differentiating circuit 205 which delivers the output pulse $c$ through a terminal 206.

The timing pulse group generating circuit 3 includes first and second constant delay elements 31 and 32 connected in series. The input of the first delay element 31 is connected to the input terminal 301 to which the output pulse $c$ is applied. On the other hand, the pulse $c$ is applied to the flip-flop 71 through an output terminal 302 as a first reference timing pulse $f_1$. The output of the first constant delay element 31 is connected to the input of the second delay element 32. Also, it is applied to the equalizing circuit 20 through an output terminal 304 as a reference timing pulse $f_0$. The output of the second delay element 32 is applied through an output terminal 303 to the flip-flop 72 as the second reference timing pulse $f_2$. In this embodiment, the delay caused by the delay elements 31 and 32 are assumed to be equal to each other. The reference timing pulses $f_1$, $f_0$ and $f_2$ will be referred to hereunder as a reference timing pulse group $f$.

One of the input terminals of each of the flip-flop 71 and 72 receives the combined signal $i-e$ from the combining circuit 6. Another input terminal of the flip-flop 71 receives the first reference timing pulse $f_1$, and the remaining input terminal of the flip-flop 72 receives the second reference timing pulse $f_2$. The flip-flops 71 and 72 generate "1" or "0" output in response to whether the level of the combined signal $i-e$ is larger or smaller than a preset threshold level at the time point of the first and second reference timing pulse $f_1$ and $f_2$ respectively. The state of the flip-flops 71 and 72 remains unchanged until the succeeding reference timing pulse $f_1$ or $f_2$ is applied.

The logic circuit 8 is comprised of four AND gates 81 to 84. The input signals applied to these gates are combinations of true- and complementary-value outputs of the flip-flops 71 and 72. The AND gate 81, to which the true-value output $g_1$ of the flip-flop 71 and complementary-value output $g_2$ of the flip-flop 72 are applied, produces the logic product $h_1$ output only when the combined signal $i-e$ is positive at the time point of the first reference timing pulse $f_1$ and when the combined signal $i-e$ is negative at the time point of the second reference timing pulse $f_2$. The output $h_1$ is applied to the phase varying circuit 2 to advance the phase of the reference timing pulse group $f$. Likewise, the AND gate 82, to which the complementary-value output $g_1$ of the flip-flop 71 and the true-value output of the flip-flop 72, produces the logic product $h_2$ only when the combined signal $i-e$ is negative at the time point of the first reference timing pulse $f_1$ and when the same signal $i-e$ ie positive at the time point of the second reference timing pulse $f_2$. The output signal $h_2$ is applied to the phase varying circuit 2 to delay the phase of the reference timing pulse group $f$. Similarly, the gate 83 produces the logic product $j_1$ only when the combined signal $i-e$ is positive not only at the time point of the first reference timing pulse $f_1$ but also at the time point of the second reference timing pulse $f_2$. The output $j_1$ is applied to the voltage control circuit 5 to increase the level of reference voltage $e$. The gate 84 produces the logic product output $j_2$ only when the combined signal $i-e$ is negative not only at the time point of the first reference timing pulse $f_1$ but also at the time point of the second reference timing pulse $f_2$. The output $j_2$ is applied to the voltage control circuit 5 to decrease the level reference voltage $e$.

FIGS. 5*a* through 5*d* illustrate relationships between the reference pulse inserted in the incoming signal $i$, reference timing pulse group $f$ and reference voltage $e$, with the part of the reference waveform near the peak point of the reference pulse enlarged.

Figure 5:
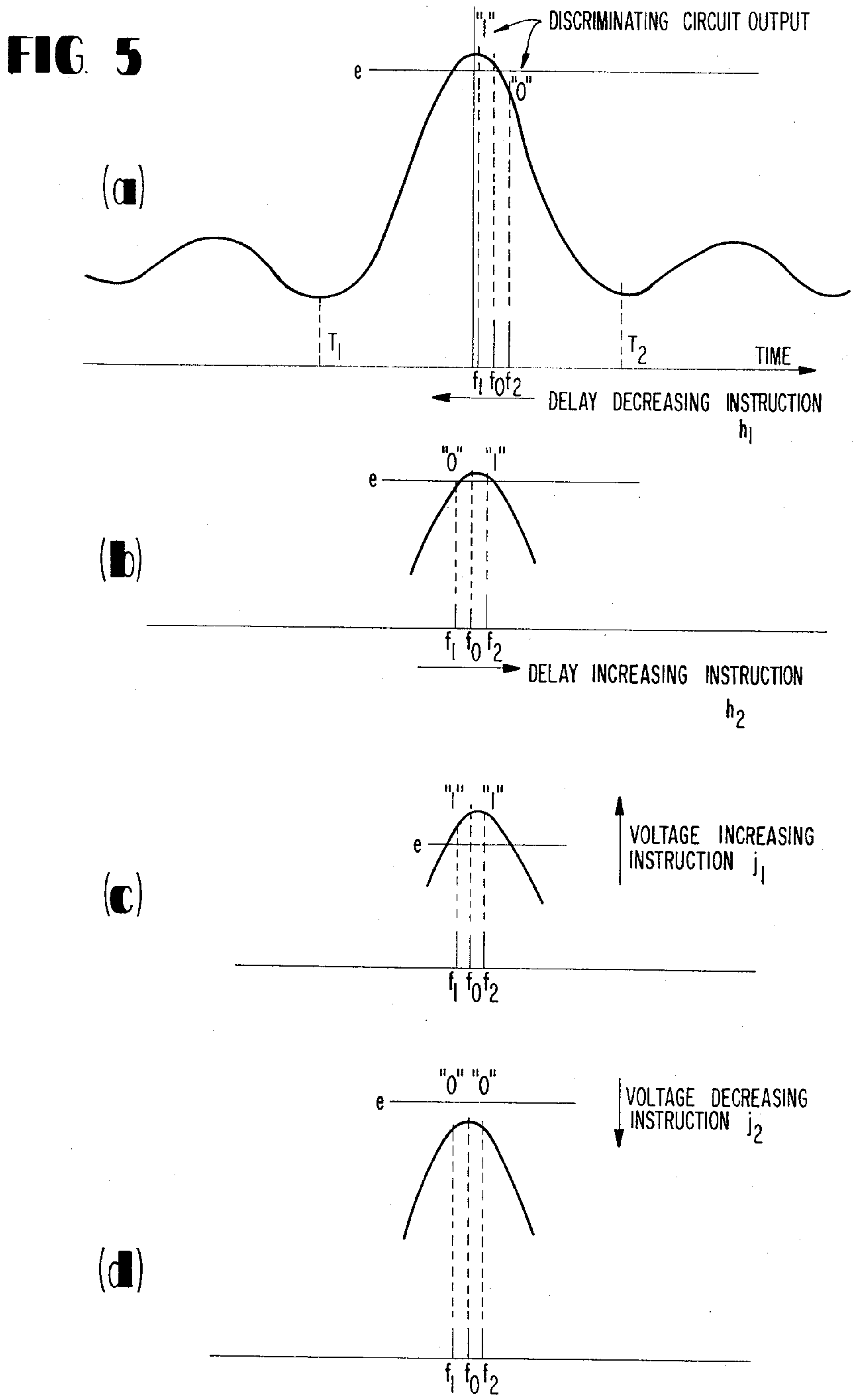

FIG. 5*a* corresponds to the case where the delay decreasing or phase advancing operation is performed at circuit 2 in response to the control signal $h_1$ to bring the timing $f_0$ into coincidence with the peak of the reference pulse. FIG. 5*b* corresponds to the case where the delay increasing or phase-delaying operation is performed in response to the control signal $h_2$ to attain the above-mentioned coincidence. FIG. 5c corresponds to the case where the voltage level increasing operation is performed at the circuit 5 in response to the control signal $j_1$ to enable the exact phase comparison between the reference timing pulses $f$ and the peak of the reference pulse. Likewise, FIG. 5d corresponds to the case where the voltage level decreasing operation is performed in response to the control signal $j_2$ to achieve the same phase comparison. It will be understood from the foregoing description that the phase tracking is performed without fail according to the present embodiment. Because phase shifting amount of the mentioned phase varying circuit 2 at the above-mentioned one time of comparing and determining operation is so selectable to be much larger than the phase variation of the reference signal in the input signal to be equalized within the corresponding period, and to be much smaller than the permissible residual correction error of the reference signal in the equalized input signal $i$, the system of FIG. 1 is able to make the mentioned reference timing track substantially exactly a point whereat the reference signal must be exactly generated through limited times of transmission of reference signals. In a TV signal transmission system, the residual correction error is permitted to the order of about 1 nS. This means that the rate of the change in the transmission characteristics of the channel is lower than 1 nS/min. Hence, it may be sufficient to set the phase shift amount at the phase varying circuit 2 at 0.1 nS. Such phase shift is repeated at the rate of once every 1/20 minute.

The time interval of the reference pulse $f_1$, $f_o$ and $f_2$ should be as narrow as possible to avoid phase tracking errors. To withstand the noise at the discririminating circuit 7, the interval may preferably broader. In a TV signal transmission system having a signal-to-noise ratio greater than 40 dB and a bandwidth of 5 MHz per channel, the reference pulse width is set at 100 nS and the suitable time interval of the reference timing pulses $f_1$, $f_o$ and $f_2$ is 10 nS. Since the present system is a peak tracking system, the maximum variable range by the phase varying circuit 2 for the reference timing pulse group $f$ must be within $T_2 - T_1$ (FIG. 5a). The reference voltage $e$ is also utilized as the maximum amplitude detected from the reference signal.

What is claimed is:

1. An automatic equalizing system for a long distance transmission channel for an information signal, said information signal having such a large frequency band width that the linear distortion due to the time varying nature of said channel is not negligible at a receiving end of said channel and having a timing burst signal and a reference pulse of a specific wave form inserted at a predetermined time at a transmitting end of said channel, comprising:

- an equalizer unit for receiving the information signal transmitted via said channel for equalizing the amplitude and delay responses of said channel;
- means for extracting a timing signal synchronized with said timing burst signal from the information signal transmitted;
- means responsive to a delay-increase-instruction signal and a delay-decrease-instruction signal for delaying the extracted timing signal in comparison with said reference pulse in the time domain by a predetermined value at a preset rate;
- reference timing pulse group generation means for producing from the output of the phase delaying means three reference timing pulses spaced apart by a predetermined interval;
- a direct current voltage source;
- means coupled with the voltage source for producing an output amplitude signal controlled in response to an amplitude-increase-instruction signal and an amplitude-decrease-instruction signal;
- timed voltage signal discriminating means responsive to the most and least delayed ones of the three reference timing pulses for level-comparing the output amplitude signal with the output of said equalizer unit at the time points defined by the most and least phase delayed ones of said three reference timing pulses thereby to deliver a pair of binary detection signals each assuming a first value of said binary signal when the level of said reference signal exceeds that of said output amplitude signal and a second value of said binary signal when the level of said output amplitude signal exceeds that of said reference signal;
- logic means coupled with said timed voltage level discriminating means for producing said delay-decrease-instruction signal when said pair of binary detection signals assume said second value at the least phase-delayed reference timing pulse and said first value at the most phase-delayed reference timing pulse, said delay-increase-instruction signal when said pair of detection signals assume said first value at the least phase-delayed reference timing pulse and said second value at the most phase-delayed reference timing pulse, said amplitude-increase-instruction signal when said pair of detection signals assumes said first value at both the most and least phase-delayed reference timing pulses and said amplitude-decrease-instruction signal when said pair of detection signals assume said second value at both the most and least phase-delayed reference timing pulses; and
- means for supplying the second phase-delayed one of said three reference timing pulses to said equalizing unit as an equalizer-control signal, whereby the peak value of the transmitted reference pulse is always brought into coincidence with a fixed time relationship with said timing signal to achieve a desired equalization operation of said equalizing unit.

2. The system of claim 1 wherein said reference signal is an equalized reference signal obtained from an equalizer unit inserted in a transmission channel carrying an information signal, which includes a timing burst signal and a reference signal of a waveform satisfying the function (sin $\theta/\theta$), said means for generating first and second timing pulses including

- means for extracting said first timing pulse from said reference signal carried by said transmission channel, said extracted pulse being synchronized with said timing burst signal.
- first delay means for delaying said first timing pulse to produce said reference timing pulse and
- second delay means for delaying said reference timing pulse to produce said second timing pulse.

3. In an automatic equalizing system for a long distance transmission channel for an information signal, said information signal having such a large frequency band width that the linear distortion due to the time varying nature of said channel is not negligible at a receiving end of said channel and having a timing burst signal and a reference signal of a specific wave form inserted at a predetermined time at a transmitting end of said channel comprising:

means, responsive to said information signal for extracting a timing signal synchronized with said timing burst signal;

means responsive to a delay-increase-instruction signal and a delay-decrease-instruction signal for selectively delaying the extracted timing signal;

reference timing pulse group generating means for producing from the output of the phase-delaying means three reference timing pulses spaced apart by a predetermined interval, the center one of said timing pulses to have a predetermined phase relative to the phase of said reference signal;

means for generating a variable level signal;

means for comparing the level of said reference signal with the level of said variable level signal at the times of occurrence of the two timing pulses phase-advanced and phase-delayed respectively from said center timing pulse;

means, responsive to said comparing means, for applying a delay-decrease-instruction signal to said phase-delaying means when the level of said reference signal is greater than the level of said variable level signal at the time of occurrence of said phase-advanced one of said timing pulses and less than the level of said variable level signal at the time of occurrence of the phase-delayed one of said timing pulses and for applying a delay-increase-instruction to said phase-delaying means when the level of said reference signal is less than the level of said variable level signal at the time of occurrence of said phase-advanced timing pulse and greater than that of the variable level signal at the time of occurrence of said phase-delayed timing pulse; and means responsive to said comparing means for increasing the level of said variable level signal when the level of said reference signal is greater than that of the variable level signal at the times of occurrence of both the phase-advanced timing pulse and phase-delayed timing pulse and for decreasing the level of said variable level signal when the level of said reference signal is less than that of the variable level signal at the times of occurrence of said phase-advanced timing pulse and phase-delayed timing pulse;

whereby the center one of said timing pulses is caused to track the peak of said reference signal.

* * * * *

UNITED STATES PATENT OFFICE
CERTIFICATE OF CORRECTION

Patent No. 3,755,736 Dated August 28, 1973

Inventor(s) Haruo KANEKO et al

It is certified that error appears in the above-identified patent and that said Letters Patent are hereby corrected as shown below:

Column 4, line 27 - After "output" delete "$g_2$" and substitute -- $\bar{g}_2$ -- line 36 - After "output" delete "$g_1$" and substitute -- $\bar{g}_1$ -- line 40 - After "e" delete "ie" and substitute -- is --

Signed and sealed this 9th day of April 1974.

(SEAL)
Attest:

EDWARD M.FLETCHER,JR.
Attesting Officer

C. MARSHALL DANN
Commissioner of Patents